F. W. McCLOSKEY.
FIELD MAGNET FOR DYNAMO ELECTRIC MACHINES.
APPLICATION FILED NOV. 7, 1916.

1,292,621. Patented Jan. 28, 1919.

WITNESSES:

INVENTOR
Frederick W. McCloskey.
BY
ATTORNEY

UNITED STATES PATENT OFFICE.

FREDERICK W. McCLOSKEY, OF PITTSBURGH, PENNSYLVANIA, ASSIGNOR TO WESTINGHOUSE ELECTRIC & MANUFACTURING COMPANY, A CORPORATION OF PENNSYLVANIA.

FIELD-MAGNET FOR DYNAMO-ELECTRIC MACHINES.

1,292,621.  Specification of Letters Patent.  Patented Jan. 28, 1919.

Application filed November 7, 1916. Serial No. 129,971.

*To all whom it may concern:*

Be it known that I, FREDERICK W. McCLOSKEY, a subject of the King of Great Britain, and a resident of Pittsburgh, in the county of Allegheny and State of Pennsylvania, have invented a new and useful Improvement in Field-Magnets for Dynamo-Electric Machines, of which the following is a specification.

My invention relates to the construction of field magnets for dynamo-electric machines, and it has for its object to provide a novel form of pole piece for dynamo-electric machines of the plural-armature type.

In the Davis Patent No. 1,186,755, June 13, 1916, is shown and described a motor in which a plurality of armatures are arranged about a centrally located counter shaft, double-face pole pieces being located between adjacent armatures. Each pole piece is provided with a single field-magnet winding, but, owing to the peculiar form of the pole piece, it has been found necessary to wind the coil by hand directly upon the pole piece, thus adding to the expense and difficulty of assembling the motor and of renewing the coils.

By my invention, I provide a double-face pole piece so constructed that a form-wound coil of the usual type may be readily assembled thereon.

Figure 1:
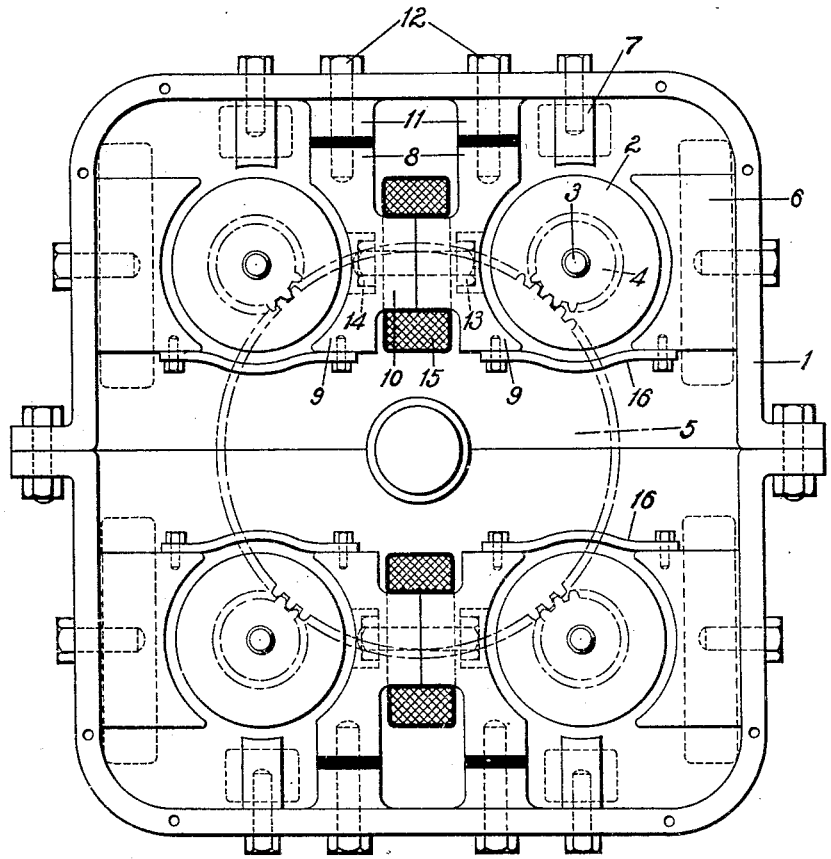
Figure 2:
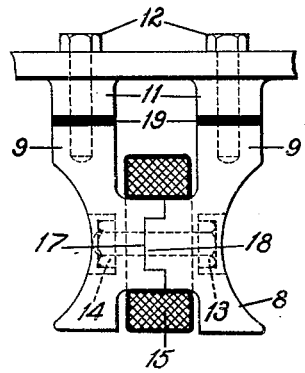

In the accompanying drawings, Figure 1 is a view, in end elevation, of a dynamo-electric machine of the plural-armature type embodying my invention, and Fig. 2 is a detail view showing a modification in the form of the pole piece.

The dynamo-electric machine comprises a divided frame 1 within each half of which two armature members 2 are rotatably mounted in side-by-side relation. The shaft 3 of each armature 2 is provided with a pinion 4 which meshes with a gear member 5 that is centrally located with respect to the several armatures. Main polar projections 6 and interpolar projections 7 are secured to the sides of the frame and are arranged symmetrically with respect to the longitudinal and vertical axes of each armature 2. Suitable main field-magnet and interpolar windings are carried by the respective polar projections 6 and 7, as shown in dotted lines.

Double-face main pole pieces 8 are located between the armature members 2 in each half of the frame 1. The pole pieces 8 are divided into similar half portions respectively comprising a pole shoe 9 and a projection 10. Each half portion is secured, by a bolt 12, to a seat 11 that is provided on the frame 1 and the respective pairs of half portions are secured together by means of bolts 13 and nuts 14 coacting therewith which also maintain the projections 10 in close engagement so that each assembled pole piece 8 is a substantially unitary magnetic structure. A field-magnet coil 15 is mounted on the abutting projections 10 of each pole piece 8 and serves in common for both pole shoes 9. Non-magnetic braces 16 extend between the pole shoes 9 and the adjacent polar projections 6.

In assembling a pole piece 8 within the frame 1, one-half portion is secured to the frame 1, and the field-magnet coil 15 is then placed upon the projection 10. The projection 10 of the other half portion of the pole piece is then placed within the opening of the coil 15 and the second half portion is secured to the frame 1. The half portions are then secured together by the bolts 12, and the braces 16 are secured to each pole shoe 9.

A modification in the form of the pole piece 8 is shown in Fig. 2, wherein one-half portion is provided with a groove 17 and the other half portion with a torque 18 adapted to fit closely within the groove 17. Insulating material 19 is interposed between the pole shoes 9 and the seats 11 in order to reduce magnetic leakage between the pole piece 8 and the frame 1.

While I have shown my invention in its preferred form, it is not so limited but is susceptible of various minor changes and modifications within the scope of the appended claims.

I claim as my invention:

1. In a dynamo-electric machine, the combination with a pair of armatures and oppositely disposed pole shoes located between said armatures, of a bolt passing through said shoes for securing said pole shoes together, and a single field-magnet winding serving in common for both of said pole shoes.

2. In a dynamo-electric machine, the combination with a pair of armatures and a divided H-shaped pole piece located between said armatures, of a field-magnet winding mounted on the middle leg of said pole piece and serving in common for both armatures.

3. In a dynamo-electric machine, the combination with a frame, a pair of armatures mounted therein, and a divided H-shaped pole piece located between said armatures, each portion of said pole piece being independently removable with respect to said frame, of a field-magnet winding mounted on the middle leg of said pole piece and serving in common for both armatures.

In testimony whereof, I have hereunto subscribed my name this 31st day of Oct., 1916.

FREDERICK W. McCLOSKEY.

Copies of this patent may be obtained for five cents each, by addressing the "Commissioner of Patents, Washington, D. C."